(12) United States Patent
Ancimer et al.

(10) Patent No.: US 12,444,758 B2
(45) Date of Patent: Oct. 14, 2025

(54) FUEL CELL REGENERATION

(71) Applicant: Cummins Inc., Columbus, IN (US)

(72) Inventors: Richard Ancimer, Toronto (CA);
Ashok Kumar, Columbus, IN (US)

(73) Assignee: CUMMINS INC., Columbus, IN (US)

(*) Notice: Subject to any disclaimer, the term of this patent is extended or adjusted under 35 U.S.C. 154(b) by 391 days.

(21) Appl. No.: 17/888,194

(22) Filed: Aug. 15, 2022

(65) Prior Publication Data
US 2023/0056450 A1  Feb. 23, 2023

Related U.S. Application Data

(60) Provisional application No. 63/234,994, filed on Aug. 19, 2021.

(51) Int. Cl.
| | |
|---|---|
| *H01M 8/04119* | (2016.01) |
| *H01M 8/04089* | (2016.01) |
| *H01M 8/04298* | (2016.01) |
| *H01M 8/04313* | (2016.01) |
| *H01M 8/04701* | (2016.01) |
| *H01M 8/04746* | (2016.01) |
| *H01M 8/04828* | (2016.01) |
| *H01M 8/04858* | (2016.01) |

(52) U.S. Cl.
CPC ... *H01M 8/04126* (2013.01); *H01M 8/04097* (2013.01); *H01M 8/04305* (2013.01); *H01M 8/04313* (2013.01); *H01M 8/04701* (2013.01); *H01M 8/04753* (2013.01); *H01M 8/04828* (2013.01); *H01M 8/04902* (2013.01); *H01M 8/0491* (2013.01); *H01M 2250/20* (2013.01)

(58) Field of Classification Search
CPC ......... H01M 8/04126; H01M 8/04097; H01M 8/04305; H01M 8/04313; H01M 8/04701; H01M 8/04753; H01M 8/04828; H01M 8/04902; H01M 8/0491; H01M 2250/20; H01M 8/04238; H01M 8/04559; H01M 8/0488; H01M 8/04835; Y02E 60/50; Y02T 90/40
USPC ....................................................... 429/413
See application file for complete search history.

(56) References Cited

U.S. PATENT DOCUMENTS

| | | | |
|---|---|---|---|
| 2003/0211372 A1 | 11/2003 | Adams | |
| 2011/0014535 A1* | 1/2011 | Choi | H01M 8/04671 |
| | | | 429/432 |
| 2014/0170512 A1* | 6/2014 | Folmsbee | H01M 8/0488 |
| | | | 324/426 |
| 2018/0331382 A1* | 11/2018 | Lynch | H02J 7/0068 |

FOREIGN PATENT DOCUMENTS

| | | | | |
|---|---|---|---|---|
| DE | 102020102398 A1 * | 8/2021 | ........ | H01M 8/04223 |
| EP | 2308122 | 4/2011 | | |
| JP | 2009110898 | 5/2009 | | |

OTHER PUBLICATIONS

Krein et al.; IEEE Transactions on Power Electronics; vol. 19; No. 5; Sep. 2004; pp. 1279-1288 (Year: 2004).*

* cited by examiner

*Primary Examiner* — Christian Roldan
(74) *Attorney, Agent, or Firm* — Barnes & Thornburg LLP (57) ABSTRACT

The present disclosure generally relates to systems and methods for fuel cell regeneration after degradation.

10 Claims, 4 Drawing Sheets

FUEL CELL REGENERATION

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/234,994 filed on Aug. 19, 2021, the entire disclosure of which is hereby expressly incorporated herein by reference.

TECHNICAL FIELD

The present disclosure generally relates to systems and methods for fuel cell regeneration after degradation.

BACKGROUND

Fuel cells, fuel cell stacks, and/or fuel cell systems are known for their efficient use of fuel to develop direct current (DC) and/or alternating current (AC) electric power for stationary or mobile applications. Fuel cell or fuel cell stack operation at high voltages, such as open circuit voltages, may be detrimental to the fuel cell or fuel cell stack health due to peroxide radical formation and/or platinum metal oxidation at the electrodes and/or due to drying out of the MEA. The fuel cell or fuel cell stack may undergo degradation when operating at such high voltages. Thus, operation of fuel cells or fuel cell stacks at high voltages is typically avoided to prevent such degradation.

Implementing strategies to avoid operating a fuel cell or fuel cell stack at low current density and/or high voltage conditions may increase the complexity of the fuel cell or fuel cell stack operation. Such increase in complexity may result in lowering the operational efficiency and/or increasing the operating cost of a vehicle comprising the fuel cell or fuel cell stack. Thus, there is a need to develop strategies and methods to operate the fuel cell or fuel cell stack at low load and/or high voltage conditions with minimal effect of the health of the fuel cell or fuel cell stack.

Described herein are methods and systems for identifying when a fuel cell or fuel cell stack needs regeneration and methods and systems for regenerating the fuel cell after degradation caused due to operating at low load and/or high voltage conditions. The present disclosure relates to methods and systems that may be implemented to reverse performance loss and/or increase the efficiency of vehicle and/or powertrain comprising the fuel cell or fuel cell stack.

SUMMARY

Embodiments of the present disclosure are included to meet these and other needs. In one aspect of the present disclosure, described herein, a method of regenerating degradation of a fuel cell or fuel cell stack includes the steps of monitoring time spent operating the fuel cell or fuel cell stack above a threshold voltage, determining a need for regenerating the degradation of the fuel cell or fuel cell stack, regenerating the degradation of the fuel cell or fuel cell stack, and ending regeneration of the fuel cell or fuel cell stack.

In some embodiments, regenerating the fuel cell or fuel cell stack may include regenerating reversible degradation of the fuel cell or fuel cell stack.

In some embodiments, regenerating the fuel cell or fuel cell stack may including changing an operating current density of the fuel cell or fuel cell stack, implementing intermittent non-open circuit voltage operation, or increasing humidity in the fuel cell or fuel cell stack. In some embodiments, changing the operating current density may include operating the fuel cell or fuel cell stack at an intermediate current density of about 0.2 A/cm$^2$ to about 0.8 A/cm$^2$. Increasing the humidity in the fuel cell or fuel cell stack may include adjusting an excess fuel ratio or an excess air ratio of the fuel cell or fuel cell stack.

In some embodiments, monitoring time spent operating the fuel cell or fuel cell stack above the threshold voltage may include determining if the time spent is above a threshold time. In some embodiments, the threshold time may be about 25 hours.

In some embodiments, determining the need for regenerating the fuel cell or fuel cell stack may include using a model to estimate a threshold time that the fuel cell or fuel cell stack can spend operating over the threshold voltage.

In some embodiments, determining the need for regenerating the fuel cell or fuel cell stack may include determining the time the fuel cell or fuel cell stack has spent operating at high voltage conditions and comparing the time the fuel cell or fuel cell stack has spent operating at high voltage to a threshold time. In some embodiments, the time the fuel cell or fuel cell stack has spent operating at high voltage conditions may be a fixed time or a weighted time, and may be determined by a model based on an operating current density or an operating voltage of the fuel cell or fuel cell stack.

In some embodiments, ending regeneration of the fuel cell or fuel cell stack may be initiated after a fixed time.

In some embodiments, ending regeneration of the fuel cell or fuel cell stack may be based on a model or may be based on the fuel cell or fuel cell stack voltage before and after generating the fuel cell or fuel cell stack. The fuel cell or fuel cell stack voltage after regenerating the fuel cell or fuel cell stack may not change from the fuel cell or fuel cell stack voltage before regeneration by more than about 1%.

In some embodiments, regenerating the degradation of the fuel cell or fuel cell stack may include increasing the recirculation rate of a fuel in the fuel cell or fuel cell stack, reducing a purge rate of the fuel, decreasing an operating temperature of the fuel cell or fuel cell stack, decreasing an operating pressure of the fuel cell or fuel cell stack, or adjusting an excess air ratio or an excess fuel ratio of the fuel cell or fuel cell stack. In some embodiments, the threshold voltage may be about 0.7 V to about 0.85 V.

In a second aspect of the present disclosure, a fuel cell or fuel cell stack operates at an operating current density, an operating voltage, and with an excess air ratio. The fuel cell or fuel cell stack includes a fuel that flows through an anode inlet of the fuel cell or a fuel cell stack at a first flow rate and an oxidant that flows through a cathode inlet of the fuel cell or fuel cell stack at a second flow rate. An operating time of the fuel cell or fuel cell stack is monitored if the operating voltage is higher than a threshold voltage. The fuel cell or fuel cell stack undergoes regeneration when required.

In some embodiments, the regeneration of the fuel cell or fuel cell stack may include changing the operating current density of the fuel cell or fuel cell stack, changing the operating voltage, decreasing the first flow rate, or decreasing the second flow rate.

In some embodiments, the operating voltage may be decreased by implementing intermittent non-open circuit operating. The operating current density of the fuel cell or fuel cell stack may be changed to an intermediate current density of about 0.2 A/cm$^2$ to about 0.8 A/cm$^2$. The first flow rate or the second flow rate may be decreased by adjusting the anode stoichiometry at the anode inlet or adjusting the cathode stoichiometry at the cathode inlet respectively. If the time spent operating the fuel cell or fuel cell stack above the threshold voltage is above a threshold time, the operating voltage may be decreased, the first flow rate may be decreased, or the second flow rate may be decreased to regenerate the fuel cell or fuel cell stack. In some embodiments, the threshold time may be about 25 hours.

In some embodiments, the regeneration of the fuel cell or fuel cell stack may include regenerating reversible degradation of the fuel cell or fuel cell stack. In some embodiments, the threshold voltage may be about 0.7 V to about 0.85 V. In some embodiments, a model is used to determine when to initiate the generation or when to stop the regeneration.

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

The present disclosure is directed to methods for regenerating a fuel cell 20 or fuel cell stack 12 after degradation 202 caused due to operating the fuel cell 20 or fuel cell stack 12 at low load and/or high voltage conditions. The present disclosure relates to methods for monitoring fuel cell 20 or fuel cell stack 12 operation to determine when to trigger a regeneration method 102. The present disclosure also relates to methods that may be implemented to reverse performance loss and/or increase the efficiency of a vehicle 100 and/or powertrain 100 comprising the fuel cell 20 or fuel cell stack 12.

Figure 1A:
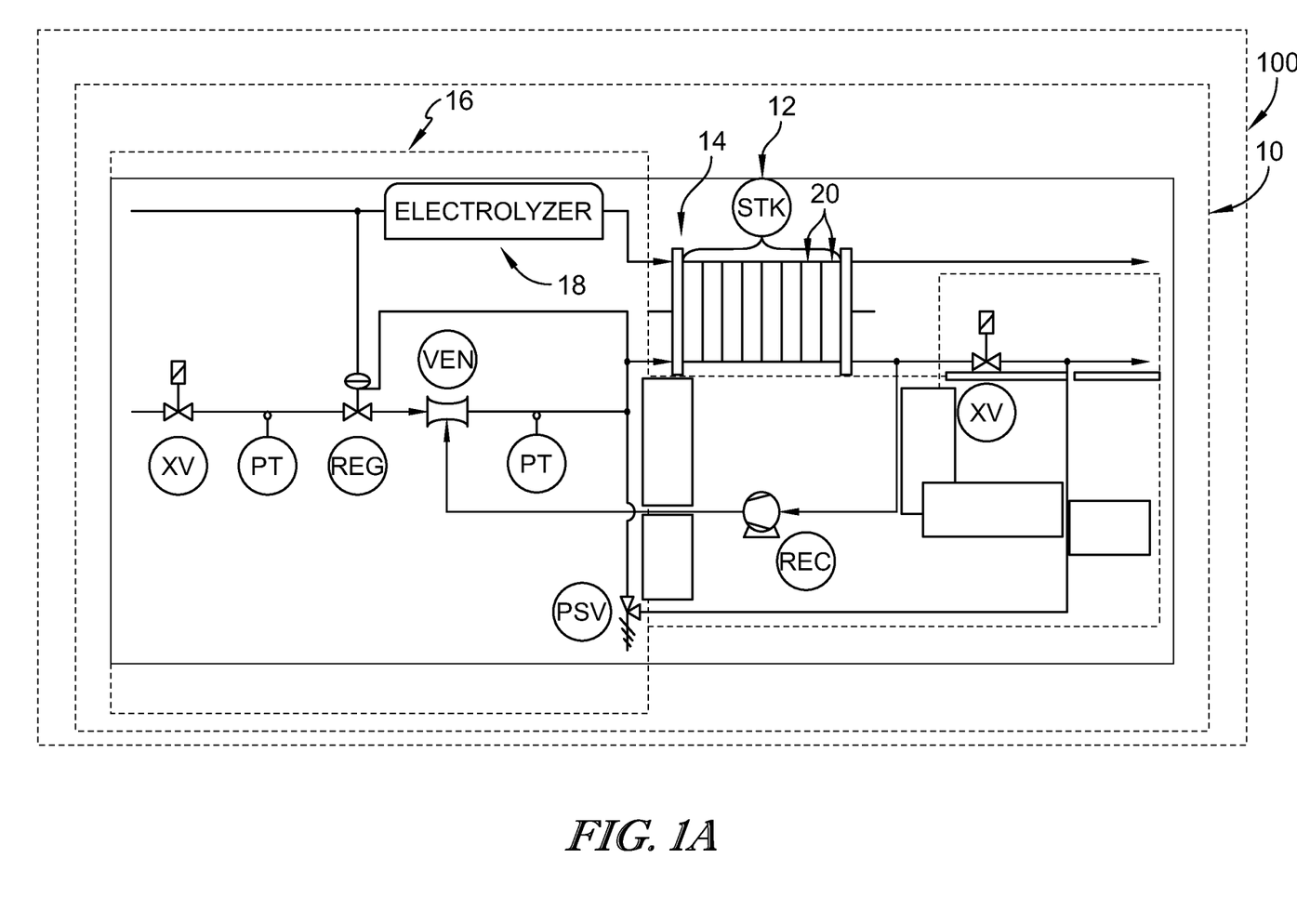
FIG. 1A is an illustration of a fuel cell system including one or more fuel cell stacks connected to a balance of plant.
Figures 1B, 1C:
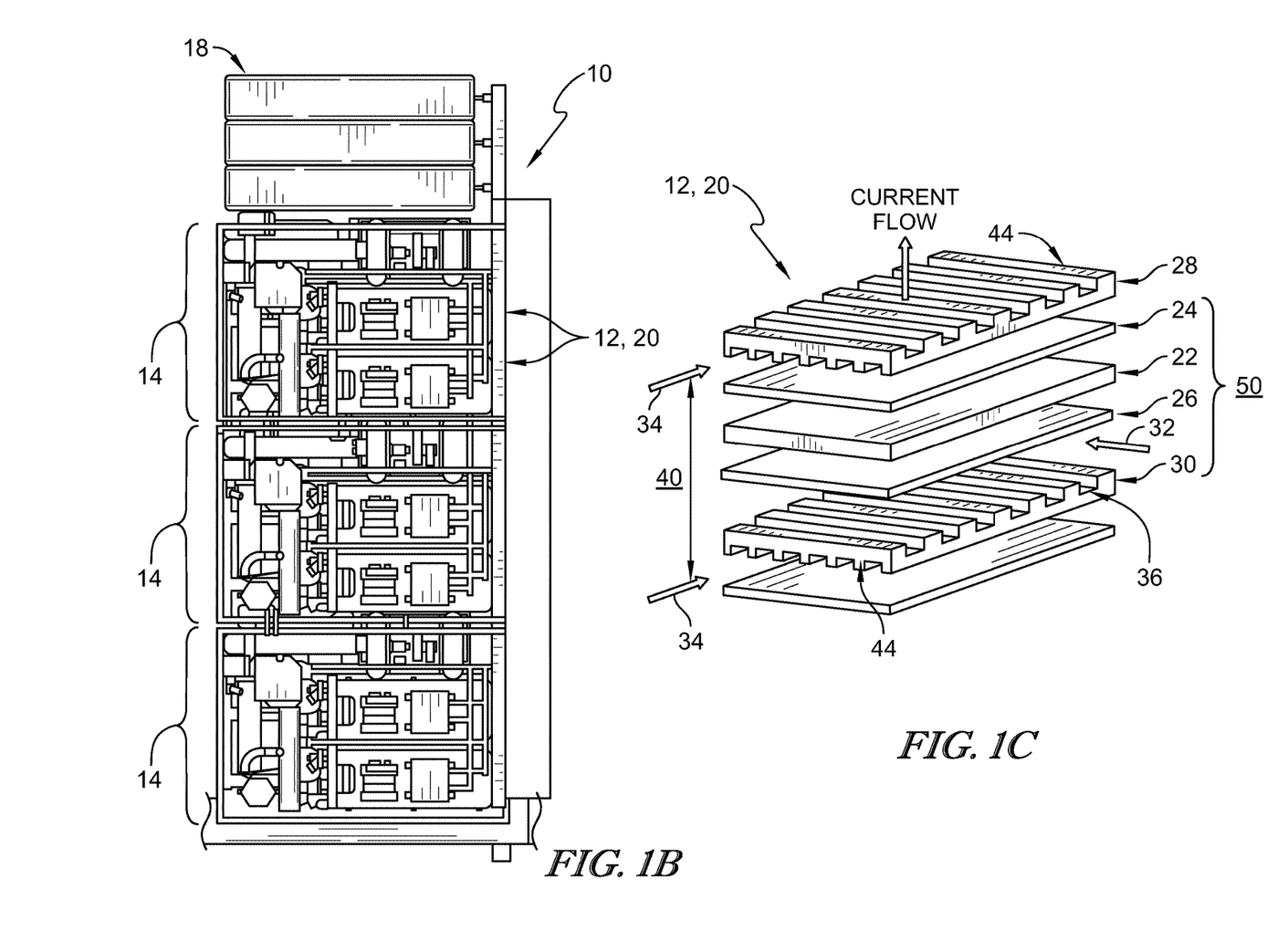
FIG. 1B is an illustration of a fuel cell system having fuel cell modules, each fuel cell module having fuel cell stacks and/or fuel cells.
FIG. 1C is an illustration of components of a fuel cell in the fuel cell stack.

As shown in FIG. 1A, fuel cell systems 10 often include one or more fuel cell stacks 12 or fuel cell modules 14 connected to a balance of plant (BOP) 16, including various components, to create, generate, and/or distribute electrical power for meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 connected together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

Certain fuel cells, such as solid oxide fuel cells (SOFCs), operate in large-scale power systems that provide electricity to satisfy industrial and municipal needs. Others are useful for smaller portable applications, such as powering cars, trucks, or other industrial equipment and vehicles. Other common types of fuel cells include phosphoric acid fuel cells (PAFCs), molten carbonate fuel cells (MCFCs), and proton exchange membrane fuel cells, all generally named after their electrolytes. The typical proton exchange membrane fuel cell (PEMFC), is comprised of many fuel cell assemblies compressed and bound into a fuel cell stack.

In an embodiment shown in FIG. 1C, the fuel cell stack 12 includes a plurality of proton exchange membrane (PEM) fuel cells 20, each of which is comprised of many fuel cell assemblies compressed and/or bound in the stack 12. Each fuel cell 20 includes a single membrane electrode assembly (MEA) 22 and a gas diffusion layer (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26. The above mentioned components, 22, 24, 26, 30 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plate (BPP) 28, 30 can uniformly distribute reactants 32, 34 to an active area 40 of each fuel cell 20 through oxidant flow fields 42 and/or fuel flow fields 44. The active area 40, where the electrochemical reactions occur to generate electrical power produced by the fuel cell 20, is centered within the gas diffusion layer (GDL) 24, 26 and the bipolar plate (BPP) 28, 30 at the membrane electrode assembly (MEA) 22. The bipolar plate (BPP) 28, 30 are compressed together to isolate and/or seal one or more reactants 32 within their respective pathways, channels, and/or flow fields 42, 44 to maintain electrical conductivity, which is required for robust during fuel cell 20 operation.

The fuel cell system 10 described herein, may be used in stationary and/or immovable power system, such as industrial applications and power generation plants. The fuel cell system 10 may also be implemented in conjunction with electrolyzers 18 and/or other electrolysis system 18. In one embodiment, the fuel cell system 10 is connected and/or attached in series or parallel to an electrolysis system 18, such as one or more electrolyzers 18 in the BOP 16 (see FIG. 1A). In another embodiment, the fuel cell system 10 is not connected and/or attached in series or parallel to an electrolysis system 18, such as one or more electrolyzers 18 in the BOP 16.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy duty vehicle.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

For example, when the electrical power required from the fuel cell 20 or fuel cell stack 12 by the vehicle and/or powertrain 100 comprising the fuel cell 20 or fuel cell stack 12 is low, the fuel cell 20 or fuel cell stack 12 is limited to operating either at an idle state (e.g., stand-by state) or at an off state. An idle state may be chosen to be a state of operation where the voltage of the fuel cell 20 or fuel cell stack 12 does not exceed a certain threshold. Thus, the amount of degradation induced by operation under high voltage is limited. Idle operation may generate more power than the system demands, requiring a sufficiently large energy storage medium (e.g., battery, fly-wheel, etc.) or requiring a means to wastefully dissipate the energy (e.g., resistor load).

Transitioning to an off state may require a passivation process to avoid degradation. The process of moving to and from the off state may take substantial time (e.g., about 10 s). If the system calls for power before the fuel cell can return from the off state, there must be sufficient stored energy available in another device. Management of these transitions may be complex as the future system demands may not be known. Thus, under such conditions system design may be sub-optimal, with sub-optimal energy storage sizing and sub-optimal energy efficiency.

Referring back to the fuel cell 20, fuel cell stack 12, and/or fuel cell system 10, all of which may operate under high voltage conditions, low voltage conditions, or intermediate voltage conditions. High voltage conditions, low current density conditions, and low humidity conditions are used synonymously to indicate fuel cell or fuel cell stack operation where the current density is lower than about 0.05 $A/cm^2$ or lower than about 0.15 $A/cm^2$ or where voltage is greater than about 0.8 V or greater than about 0.85 V. The MEA may have a tendency of drying when the fuel cell or fuel cell stack is operating under these conditions.

When there is no or less load demand, the fuel cell or fuel cell stack may operate at high voltage conditions. The fuel cell or fuel cell stack may operate at high voltages such as open circuit voltage (OCV) or open circuit potential (OCP). For example, a vehicle comprising a fuel cell or fuel cell stack may operate at a high voltage during a traffic light stop, at a traffic jam, or idling conditions, etc.

At intermediary load conditions, the fuel cell or fuel cell stack may be operating at voltages in the intermediary range. The fuel cell or fuel cell stack may operate in the intermediary voltage conditions when the voltage ranges from about 0.65 V to about 0.85 V and/or the current density ranges from about 0.15 $A/cm^2$ to about 0.6 $A/cm^2$.

Low voltage conditions and high current density conditions are used synonymously to indicate fuel cell or fuel cell stack operation where the current density is greater than about 0.6 $A/cm^2$ or greater than about 1 $A/cm^2$ or where voltage is lower than about 0.65 V or lower than about 0.7 V. Humidity may be controlled using operating condition to avoid flooding. The system may be stressed under low voltage conditions and high current density conditions and the system may be more sensitive to operating conditions. Under such conditions, it may be important to avoid accelerated degradation via flooding or starvation of the fuel cell or fuel cell stack to prevent performance loss.

In one embodiment of the present disclosure, the regeneration method 102 may be implemented to recover performance loss induced by operating the fuel cell 20 or fuel cell stack 12 at the low current density, open circuit voltage (OCV), or high voltage ranges (e.g., above about 0.8 V or above about 0.85 V). All voltages referred to may be fuel cell 20 voltage or fuel cell stack 12 voltages. In some embodiments, the fuel cell stack 12 voltages may be determined based on the fuel cell 20 voltage and the number of fuel cells 20 comprised in the fuel cell stack 12.

Figure 3:
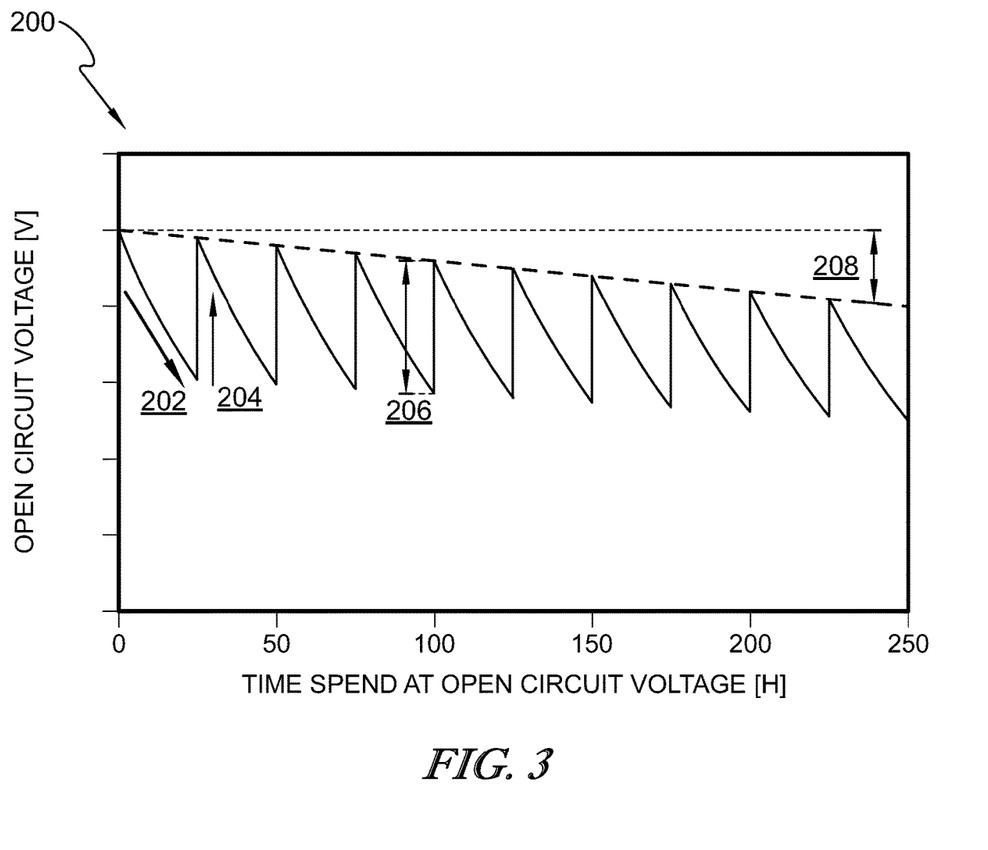
FIG. 3 is a schematic illustrating reversible and irreversible degradation due to operating a fuel cell or fuel cell stack at high voltage such as open circuit voltage (OCV).

Fuel cell stack 12 voltage may be determined by either summing individual fuel cell 20 voltages for all fuel cells 20 of the fuel cell stack 12 or multiplying the average fuel cell 20 voltage by the number of fuel cells 20 in the fuel cell stack 20. A fuel cell 20 or fuel cell stack 12 may undergo degradation 202 comprising reversible degradation 206 and/or irreversible degradation 208. In some embodiments, the regeneration method 102 may be implemented to recover performance loss induced due to reversible degradation 206.

In one embodiment, the regeneration method 102 may be implemented to increase the efficiency of the fuel cell 20 or fuel cell stack 12. In other embodiments, the regeneration method 102 may be implemented to improve the health of the fuel cell 20 or fuel cell stack 12. In some embodiments, the regeneration method 102 may be implemented to recover efficiency loss in a fuel cell 20 or fuel cell stack 12 induced due reversible degradation 206. In other embodiments, the regeneration method 102 may be implemented to improve the health of the fuel cell 20 or fuel cell stack 12 due reversible degradation 206. In some other embodiments, if the fuel cell 20 or fuel cell stack 12 is diagnosed to be degraded, the regeneration method 102 may be implemented to determine if the performance degradation 202 may be recovered.

Figure 2:
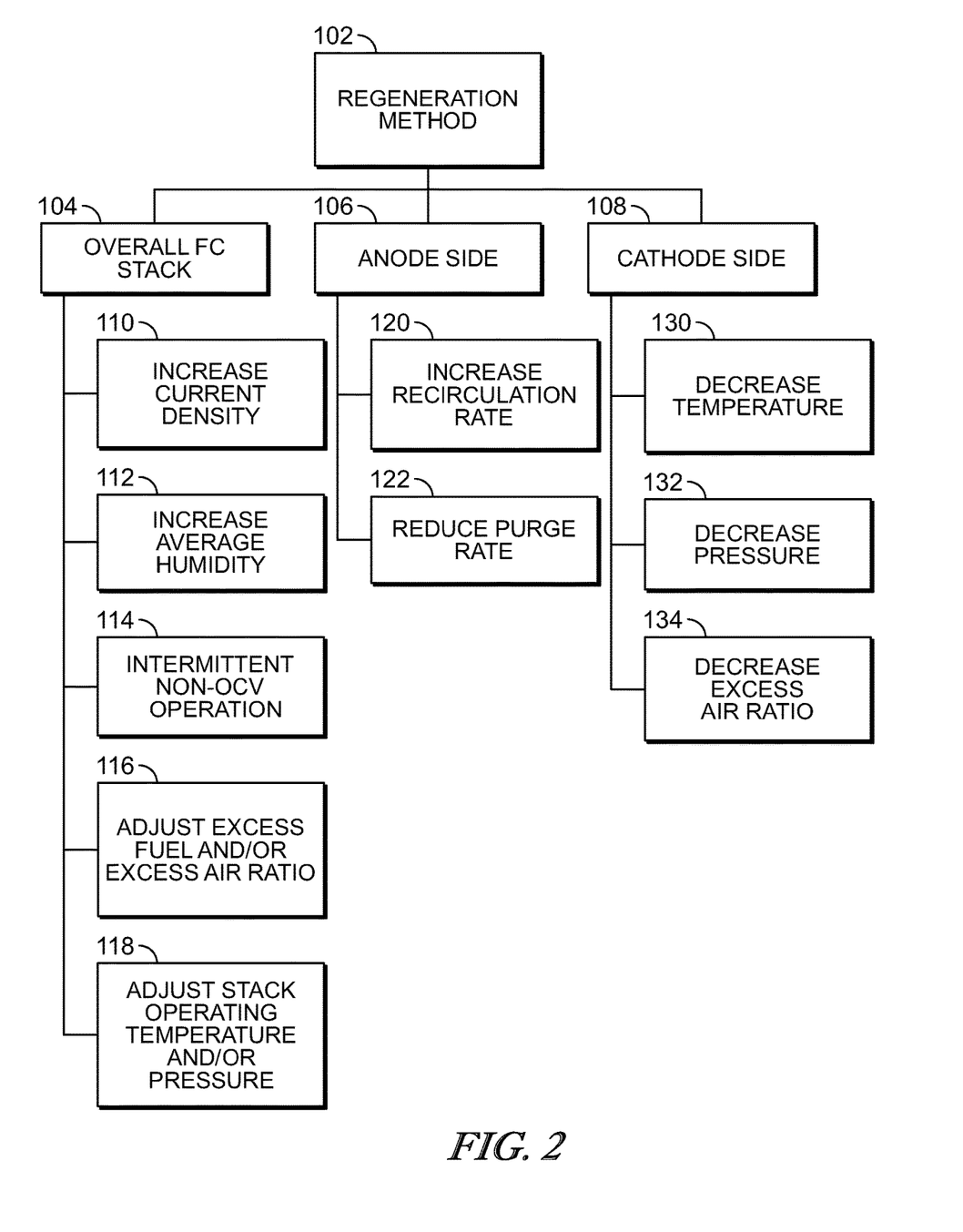
FIG. 2 is schematic illustrating pathways to regenerate a fuel cell or fuel cell stack after degradation caused by operating the fuel cell or fuel cell stack at high voltage such as open circuit voltage (OCV).

In one embodiment, the regeneration method 102 may comprise implementing intermittent non-open circuit voltage operation 114 based on a threshold voltage. In some embodiments, the regeneration method 102 may comprise operating a vehicle 100 and/or powertrain 100 comprising the fuel cell 20 or fuel cell stack 12 at a voltage above a threshold voltage (e.g., about 0.7 V to about 0.8 V) and monitoring the time the vehicle 100 and/or powertrain 100 spends operating above this threshold voltage. In some embodiments, the threshold voltage may be about 0.7 V to about 0.8 V, including any specific voltage or range of voltage comprised therein. In other embodiments, the threshold voltage may be a high voltage condition.

In one embodiment, the regeneration method 102 may be implemented in a vehicle 100 and/or powertrain 100 comprising a fuel cell 20 or fuel cell stack 12 operating at a low current density (load) or high voltage ranges (e.g., above about 0.8 V or above about 0.85 V). In some embodiments, the regeneration method 102 may be implemented in a vehicle 100 and/or powertrain 100 comprising a fuel cell 20 or fuel cell stack 12 operating at an open circuit voltage (OCV).

In one embodiment, the regeneration method 102 may be implemented to monitor the humidity state of the MEA 22. Extended operation at a lower operating current density may result in a drier MEA 22 because of an increase in air flow 34 required to prevent flooding at the target fuel cell stack 12 operating temperature or pressure. For example, a drier MEA 22 could occur with stack operation at operating current densities below a threshold current density (e.g., 0.2 or 0.1 A/cm$^2$). In some embodiments, the threshold current density may range from about 0.05 A/cm$^2$ to about 0.15 A/cm$^2$, about 0.15 A/cm$^2$ to about 0.25 A/cm$^2$, about 0.25 A/cm$^2$ to about 0.35 A/cm$^2$, including any specific current density or range comprised therein. A similar method 102 as described above could be used to trigger a regeneration event comprising a regeneration method 102 based on the humidity state of the MEA 22.

Monitoring the operation of a fuel cell 20 or fuel cell stack 12 to determine and/or identify the need to employ a regeneration method 102 may be critical to ensure the performance and/or efficiency of the fuel cell 20 or fuel cell stack 12. In one embodiment, the regeneration method 102 may be implemented after a pre-determined time-period. In some embodiments, the regeneration method 102 may be implemented after a time-period determined in real time. In some embodiments, the time-period may range from about 90 hours to about 100 hours, about 80 hours to about 90 hours, about 70 hours to about 80 hours, about 60 hours to about 70 hours, about 60 hours to about 70 hours, or about 50 hours to about 60 hours, including any specific time-period or range comprised therein.

In one embodiment, the regeneration method 102 may be implemented using a model based method. A model based method of determining when a fuel cell 20 or fuel stack 12 requires regeneration may be depend on variables such as operating current density, operating voltage, water 36 generated during operation, anode 106 and/or cathode 108 flow rates, operating temperature, and/or operating pressure.

In one embodiment, the model based method may estimate when the fuel cell 20 or fuel cell stack 12 requires regeneration 204 based on time spent under different operating conditions such as operating current density, operating voltage, water 36 generated during operation, anode 106 and/or cathode 108 flow rates, operating temperature, and/or operating pressure. In one embodiment, the model may differentially weigh the time spent by the fuel cell 20 or fuel cell stack 12 operating at different operating conditions (e.g., operating current density, operating voltage). For example, the time spent by the fuel cell 20 or fuel cell stack 12 operating at open circuit voltage (OCV) comprising a current density of about 0 A/cm$^2$ might be more heavily weighted than the time spent by the fuel cell 20 or fuel cell stack 12 operating at a current density of about 0.01 A/cm$^2$.

In some embodiments, the model based method may trigger the regeneration method 102 once a weighted threshold time is reached. In other embodiments, a controller (not shown) comprised in the vehicle 100 and/or powertrain 100 may trigger the regeneration method 102 once a weighted threshold time is reached. In other embodiments, a controller (not shown) comprised outside the vehicle 10 and/or powertrain 100 may trigger the regeneration method 102 once a weighted threshold time is reached.

In some embodiments, the threshold time or weighted threshold time may range from about 40 hours to about 50 hours, about 35 hours to about 40 hours, about 30 hours to about 35 hours, about 25 hours to about 30 hours, about 20 hours to about 25 hours, or about 15 hours to about 20 hours, including any specific time or range comprised therein. In some embodiments, the threshold time or weighted threshold time may range from about 15 hours to about 20 hours, about 10 hours to about 15 hours, about 5 hours to about 10 hours, or about 1 hour to about 5 hours, including any specific time or range comprised therein. In some embodiments, employing the regeneration method 102 after about 20 hours to about 30 hours may result in less irreversible degradation 208 compared to employing the regeneration method 102 after about 80 to about 100 hours.

In one embodiment, the implementation of the regeneration method 102 may depend on the operating voltage of the fuel cell 20 or fuel cell stack 12. In some embodiments, the implementation of the regeneration method 102 may depend on a fuel cell 20 or fuel cell stack 12 monitoring voltage threshold. In some embodiments, the fuel cell 20 or fuel cell stack 12 monitoring voltage threshold may be about 0.7 V to about 0.8 V, including any specific voltage or range of voltage comprised therein.

In one embodiment, the implementation of the regeneration method 102 may depend on a combination of a pre-determined time-period and the fuel cell 20 or fuel cell stack 12 monitoring voltage threshold. If the voltage of the fuel cell 20 or fuel cell stack 12 changes by an amount equal to about 0.01 V to about 0.05 V, including by any specific voltage or range comprised therein before the pre-determined time-period lapses, the regeneration method 102 may be triggered. In some embodiments, the regeneration method 102 may be triggered when the time spent by the vehicle 100 and/or powertrain 100 comprising the fuel cell 20 or fuel cell stack 12 operating above threshold voltage is above the threshold time. In other embodiments, the regeneration method 102 may be triggered when the decay level of the fuel cell 20 or fuel cell stack 12 operating above the threshold voltage is above a threshold decay level.

In one embodiment, the regeneration method 102 may be triggered after an absolute time-period. The fuel cell system 10 may not be monitored for any time threshold or voltage threshold. The regeneration method 102 may be triggered with any monitoring. In some embodiments, the regeneration method 102 may be triggered after the fuel cell 20 or fuel cell stack 12 operates in idle state for pre-determined number of times. In some embodiments, the fuel cell 20 or fuel cell stack 12 may operate in idle state from about 2 times to about 5 times, from about 5 times to about 10 times, or from about 10 times to about 20 times, including any specific number of times or range comprised therein.

In one embodiment, as illustrated in FIG. 2, a regeneration method 102 may be implemented in the entire fuel cell 20 or fuel cell stack 12 as shown in block 104. In other embodiments, the regeneration method 102 may be implemented at an anode side 106 or at a cathode side 108 of the fuel cell 20 or fuel cell stack 12. In some embodiments, the regeneration method 102 implemented in the entire fuel cell 20 or fuel cell stack 12 at block 104 may comprise increasing the operating current density at block 110, increasing the average humidity of the entire fuel cell 20 or fuel cell stack 12 at block 112, implementing intermittent non-open circuit voltage operation at block 114, modifying or adjusting excess fuel ratio and/or excess air ratio at block 116, and/or modifying or adjusting the operating temperature and/or pressure of the fuel cell 20 or fuel cell stack 12 at block 118.

In one embodiment, a regeneration event may comprise implementing one or more of the regeneration methods 102. In some embodiments, the regeneration method 102 may be triggered by a regeneration event. In some embodiments, the regeneration method 102 triggered by the regeneration event may comprise operating the fuel cell 20 or fuel cell stack 12 in conditions that may regenerate 204 the fuel cell 20 or fuel cell stack 12. In other embodiments, the regeneration method 102 triggered by the regeneration event may comprise operating the fuel cell 20 or fuel cell stack 12 in conditions that may increase the performance or efficiency of the fuel cell 20 or fuel cell stack 12. In some embodiments, the regeneration method 102 triggered by the regeneration event may comprise operating the fuel cell 20 or fuel cell stack 12 at a voltage below the threshold voltage, operating the fuel cell 20 or fuel cell stack 12 at higher cathode 108 humidity conditions, operating the fuel cell 20 or fuel cell stack 12 at higher anode 106 humidity conditions, and/or operating the fuel cell 20 or fuel cell stack 12 at or near a maximum allowable temperature.

In one embodiment, the fuel cell 20 or fuel cell stack 12 may be able to operate at open current voltage (OCV) if the operating temperature is decreased. Operation at a lower temperature may minimize the degradation 202 caused due to high temperature and low humidity. Maintaining higher relative humidity may be relatively easier at lower temperatures compared to higher temperatures. In some embodiments, the fuel cell 20 or fuel cell stack 12 may be able to operate at open current voltage (OCV) if the operating temperature ranges from about 55° C. to about 60° C., from about 60° C. to about 65° C., from about 65° C. to about 70° C., or from about 70° C. to about 75° C., including any specific temperature or range comprised therein.

FIG. 3 shows a graph 200 illustrating the impact of implementing one embodiment of a regeneration method 102 on a fuel cell 20 or fuel cell stack 12 operating at open circuit voltage. 202 indicates the degradation occurring in the fuel cell 20 or fuel cell stack 12 at different time points during its operation. 204 indicates the regeneration of fuel cell 20 or fuel cell stack 12 when the regeneration method 102 is implemented at different time points during the operation of the fuel cell 20 or fuel cell stack 12. 206 indicates the reversible degradation the fuel cell 20 or fuel cell stack 12 undergoes when operating at open circuit voltage. Implementing the regeneration method 102 reverses this reversible component 206 of the fuel cell 20 or fuel cell stack 12 degradation. 208 indicates the cumulating irreversible degradation the fuel cell 20 or fuel cell stack 12 undergoes when operating at open circuit voltage for a given period of time. The irreversible component 208 of fuel cell 20 or fuel cell stack 12 degradation may not be recovered by the regeneration method 102.

In one embodiment, there may be trade-off between the time the fuel cell 20 or fuel cell stack 12 is operating at high voltage or low current density and the time it takes to regenerate 204 the fuel cell 20 or fuel cell stack 12 or recover the performance of the fuel cell 20 or fuel cell stack 12. In some embodiments, regeneration of the fuel cell 20 or fuel cell stack 12 may be more efficient if the regeneration method 102 is implemented more times or at a higher frequency. For example, after operating a fuel cell 20 or fuel cell stack 12 for about 68 hours at open circuit voltage, full performance regeneration 204 may not be achieved for the fuel cell 20 or fuel cell stack 12 if a regeneration method 102 is implemented at the end of the operation period. However, if the regeneration method 102 is implemented at about every 10 hours after the 68 hours of operation, the fuel cell 20 or fuel cell stack 12 may completely recover the reversible component of its degradation after about 3 regenerations.

In some embodiments, the regeneration method 102 may be implemented about every 2 hours to about 10 hours, about every 10 hours to about 20 hours, about every 20 hours to about 30 hours, about every 30 hours to about 40 hours, about every 40 hours to about 50 hours, about every 50 hours to about 60 hours, about every 60 hours to about 70 hours, about every 70 hours to about 80 hours, about every 80 hours to about 90 hours, or about every 90 hours to about 100 hours, including any after any specific time or ranges of time comprised therein. In some preferred embodiments, the regeneration method 102 may be implemented about every 25 hours.

In one embodiment, the regeneration method 102 may comprise operating fuel cell 20 or fuel cell stack 12 at a higher current density to increase rate of regeneration 204. In some embodiments, the regeneration method 102 may comprise operating the fuel cell 20 or fuel cell stack 12 at a low current density, intermediate current density, or at a high current density.

In one embodiment, the low current density may comprise less than about 0.05 $A/cm^2$, 0.05 $A/cm^2$ to about 0.15 $A/cm^2$, or from about 0.15 $A/cm^2$ to about 0.2 $A/cm^2$, including any specific current density or range comprised therein. In some embodiments, the intermediate current density may comprise from about 0.2 $A/cm^2$ to about 0.25 $A/cm^2$, from about 0.25 $A/cm^2$ to about 0.35 $A/cm^2$, from about 0.35 $A/cm^2$ to about 0.45 $A/cm^2$, from about 0.45 $A/cm^2$ to about 0.55 $A/cm^2$, from about 0.55 $A/cm^2$ to about 0.65 $A/cm^2$, from about 0.65 $A/cm^2$ to about 0.75 $A/cm^2$, or from about 0.75 $A/cm^2$ to about 0.80 $A/cm^2$, including any specific current density or range comprised therein. In other embodiments, the high current density may comprise from about 0.80 $A/cm^2$ to about 0.9 $A/cm^2$, or from about 0.9 $A/cm^2$ to about 1.0 $A/cm^2$, from about 1.0 $A/cm^2$ to about 1.2 $A/cm^2$, from about 1.2 $A/cm^2$ to about 1.4 $A/cm^2$, from about 1.4 $A/cm^2$ to about 1.6 $A/cm^2$, or from about 1.6 $A/cm^2$ to about 1.8 $A/cm^2$, including any specific current density or range comprised therein.

In one embodiment, the regeneration method 102 comprising operating the fuel cell 20 or fuel cell stack 12 at an intermediate current density may be more flexible than operating the fuel cell 20 or fuel cell stack 12 at a low current density or high current density. In some embodiments, implementing intermittent non-open circuit voltage operation 114 may comprise intermittently operating the fuel cell 20 or fuel cell stack 12 at high current density or at high humidity modes. In other embodiments, intermittently operating the fuel cell 20 or fuel cell stack 12 at high current density may not allow for modification of the operating state of the fuel cell 20 or fuel cell stack 12.

In one embodiment, modifying or adjusting excess fuel ratio and/or excess air ratio 116 may comprise adjusting the anode stoichiometry at the anode 106 inlet or adjusting the cathode stoichiometry at the cathode 108 inlet. In some embodiments, the regeneration method 102 may comprise increasing the relative humidity of the anode 106 inlet. In some embodiments, if the recirculation flow in the fuel cell 20 or fuel cell stack 12 comprises water 36, the recirculation flow may be increased. Fresh fuel or hydrogen flow 32 may be controlled to maintain the pressure balance of the anode 106 with the cathode 108 because fresh fuel 32 offsets the fuel 32 consumed within the fuel cell 20 or fuel cell stack 12. In some embodiments, the anode stoichiometry may decrease during fuel cell 20 or fuel cell stack 12 operation.

In one embodiment, as shown in FIG. 2, the regeneration method 102 at the anode 106 may comprise increasing the recirculation rate of the fuel 32 at block 120 or reducing the fuel 32 purge rate at block 122. In one embodiment, the regeneration method 102 at the cathode 108 may comprise decreasing the operating temperature at block 130, decreasing the operating pressure at block 132, or decreasing the excess air ratio at block 134.

In one embodiment, the regeneration method 102 may comprise tracking the time spent above the threshold voltage i.e., the time the fuel cell 20 or fuel cell stack 12 is undergoing degradation due to operating at a high voltage. In other embodiments, the regeneration method 102 may comprise tracking the decay level of the fuel cell 20 or fuel cell stack 12 due to operating the vehicle 100 and/or powertrain 100 at high voltage conditions (e.g., above about 0.8 V, or above about 0.85 V).

In one embodiment, the frequency and/or duration of the regeneration event comprising the regeneration method 102 may be determined or calibrated to recover the performance or efficiency of the fuel cell 20 or fuel cell stack 12 to a level before degradation 202. In some embodiments, operating the fuel cell 20 or fuel cell stack 12 above the threshold voltage may cause reversible 206 and/or irreversible degradation 208. In one embodiment, the frequency and duration of the regeneration event comprising the regeneration method 102 may be determined or calibrated to regenerate 204 any reversible degradation 206 in the fuel cell 20 or fuel cell stack 12.

In one embodiment, a regeneration event comprising a regeneration method 102 may be implemented to maintain the health of a fuel cell 20 or fuel cell stack 12 if the regeneration method 102 is implemented intermittently while the fuel cell 20 or fuel cell stack 12 is operating at open circuit voltage. In some embodiments, the regeneration method 102 may comprise operating the fuel cell or fuel cell stack at lower voltages for different lengths of time. In some embodiments, the regeneration method 102 may comprise operating the fuel cell or fuel cell stack at a low voltage condition or intermediary voltage conditions for less than about 1 min, about 1 min to about 5 min, about 5 min to about 15 min, about 15 min to about 30 min, about 30 min to about 60 min, or for more than 60 min, including any specific time-period comprised therein. In some preferred embodiment, the regeneration method 102 may be implemented for about 5 min to about 15 min.

In one embodiment, a model may estimate when to stop implementing the regeneration method 102 based on the operating conditions for the fuel cell 20 or fuel cell stack 12 such as operating current density, operating voltage, water 36 generated during operation, anode 106 and/or cathode 108 flow rates, operating temperature, and/or operating pressure. In some embodiments, the regeneration method 102 may be stopped after a time-period determined by a model. For a given operating condition under which regeneration 204 is being undertaken, a model may determine or estimate the rate of regeneration 204, the reversible process, or the rate of humidification of the MEA 22, and determine when to stop the regeneration method 102 accordingly.

In one embodiment, the fuel cell 20 or fuel cell stack 12 voltage may be monitored before and after implementing the regeneration method 102, and at the same operating conditions. In some embodiments, the regeneration method 102 may be stopped if the fuel cell 20 or fuel cell stack 12 voltage after implementing the regeneration method 102 is not increasing or is plateauing. For example, the regeneration method 102 may be stopped if fuel cell 20 or fuel cell stack 12 voltage after implementing the regeneration method 102 changed by less than about 1%.

In one embodiment, the regeneration method 102 may be stopped after evaluating the fuel cell 20 or fuel cell stack 12 after implementing the regeneration method 102 and after the passage of a pre-determined time-period. In some embodiments, the pre-determined time-period may be evaluated in real time to ensure that the pre-determined time-period is sufficient time for implementing the regeneration method 102. In some embodiments, if the pre-determined time period is not sufficient time, the regeneration method 102 may be re-implemented.

In one embodiment, the regeneration method 102 may be sequentially implemented more than once. The fuel cell 20 or fuel cell stack 12 voltage before and after each implementation may be determined. In some embodiments, each implementation of the regeneration method 102 may be done for a fixed time-period or a variable time-period. In some embodiments, the sequential implementation of the regeneration method 102 may depend on the determination of the fuel cell 20 or fuel cell stack 12 voltage before and after each implementation.

In one embodiment, the sequential implementation of the regeneration method 102 may be stopped if the fuel cell 20 or fuel cell stack 12 after the implementation of the regeneration method 102 changed by less than about 1%. In some embodiments, the time-period of each sequential implementation may be determined by a model based on the operating current density, operating voltage, water 36 generated during operation, anode 106 and/or cathode 108 flow rates, operating temperature, and/or operating pressure of the fuel cell 20 or fuel cell stack 12. In some embodiments, the sequential implementation of the regeneration method 102 may be stopped after a pre-determined number of implementations.

In one embodiment, the regeneration method 102 may comprise operating the fuel cell 20 or fuel cell stack 12 in combination with an energy storage device (not shown). In some embodiments, the regeneration method 102 may comprise operating the fuel cell 20 or fuel cell stack 12 in combination with an energy dissipation device (not shown). In other embodiments, if the parasitic loads on the vehicle 100 and/or powertrain 100 comprising the fuel cell 20 or fuel cell stack 12 may be anticipated, the parasitic load may be engaged ahead of time. In some embodiments, the parasitic loads may comprise one or more vehicle 100 cooling fans, pumps, cabin HVACs, or other components.

In one embodiment, the regeneration method 102 may be implemented to assess whether any performance degradation 202 is reversible 206. For example, if fuel cell 20 voltage monitoring indicates performance has degraded 202, an active regeneration 204 may be carried out to determine if the performance can be recovered.

In one embodiment, the regeneration method 102 may be implemented when the vehicle 100 and/or powertrain 100 comprising a fuel cell 20 or fuel cell stack 12 is operating under transient conditions. In some embodiments, the humidity state of the MEA 22 may be tracked. In some embodiments, when the MEA 22 is exposed to off nominal conditions such as high voltage conditions (e.g., above about 0.8 V or above about 0.85 V), the fuel cell 20 or fuel cell stack 12 may undergo regeneration to re-humidify the MEA 22. In other embodiments, the fuel cell 20 or fuel cell stack 12 may be operated under operating conditions that may dry out the MEA 22 if it is too wet.

In one embodiment, the regeneration method 102 may comprise anticipating the humidity state of the MEA 22 based on the operating conditions of the fuel cell 20 or fuel cell stack 12. For example, a look-ahead algorithm may be used to determine when the vehicle 100 or machine comprising the fuel cell 20 or fuel cell stack 12 will come to a stop. In some embodiments, the fuel cell 20 or fuel cell stack 12 may undergo regeneration 204 in anticipation of this stop event.

The following described aspects of the present invention are contemplated and non-limiting:

A first aspect of the present invention relates to a method of regenerating degradation of a fuel cell or fuel cell stack. The method includes the steps of monitoring time spent operating the fuel cell or fuel cell stack above a threshold voltage, determining a need for regenerating the degradation of the fuel cell or fuel cell stack, regenerating the degradation of the fuel cell or fuel cell stack, and ending regeneration of the fuel cell or fuel cell stack.

A second aspect of the present invention relates to a fuel cell or fuel cell stack. The fuel cell or fuel cell stack operates at an operating current density, an operating voltage, and with an excess air ratio. The fuel cell or fuel cell stack includes a fuel that flows through an anode inlet of the fuel cell or a fuel cell stack at a first flow rate and an oxidant that flows through a cathode inlet of the fuel cell or fuel cell stack at a second flow rate. An operating time of the fuel cell or fuel cell stack is monitored if the operating voltage is higher than a threshold voltage. The fuel cell or fuel cell stack undergoes regeneration when required.

In the first aspect of the present invention, regenerating the fuel cell or fuel cell stack may include regenerating reversible degradation of the fuel cell or fuel cell stack.

In the first aspect of the present invention, regenerating the fuel cell or fuel cell stack may including changing an operating current density of the fuel cell or fuel cell stack, implementing intermittent non-open circuit voltage operation, or increasing humidity in the fuel cell or fuel cell stack. In the first aspect of the present invention, changing the operating current density may include operating the fuel cell or fuel cell stack at an intermediate current density of about 0.2 A/cm$^2$ to about 0.8 A/cm$^2$. In the first aspect of the present invention, increasing the humidity in the fuel cell or fuel cell stack may include adjusting an excess fuel ratio or an excess air ratio of the fuel cell or fuel cell stack.

In the first aspect of the present invention, monitoring time spent operating the fuel cell or fuel cell stack above the threshold voltage may include determining if the time spent is above a threshold time.

In the first aspect of the present invention, determining the need for regenerating the fuel cell or fuel cell stack may include using a model to estimate a threshold time that the fuel cell or fuel cell stack can spend operating over the threshold voltage. In the first aspect of the present invention, determining the need for regenerating the fuel cell or fuel cell stack may include determining the time the fuel cell or fuel cell stack has spent operating at high voltage conditions and comparing the time the fuel cell or fuel cell stack has spent operating at high voltage to a threshold time. In the first aspect of the present invention, the time the fuel cell or fuel cell stack has spent operating at high voltage conditions may be a fixed time or a weighted time, and may be determined by a model based on an operating current density of the fuel cell or fuel cell stack. In the first aspect of the present invention, the time the fuel cell or fuel cell stack has spent operating at high voltage conditions may be a fixed time or a weighted time, and may be determined by a model based on an operating voltage of the fuel cell or fuel cell stack.

In the first aspect of the present invention, ending regeneration of the fuel cell or fuel cell stack may be initiated after a fixed time. In the first aspect of the present invention, ending regeneration of the fuel cell or fuel cell stack may be based on a model or may be based on the fuel cell or fuel cell stack voltage before and after generating the fuel cell or fuel cell stack. In the first aspect of the present invention, the fuel cell or fuel cell stack voltage after regenerating the fuel cell or fuel cell stack may not change from the fuel cell or fuel cell stack voltage before regeneration by more than about 1%.

In the first aspect of the present invention, regenerating the degradation of the fuel cell or fuel cell stack may include increasing the recirculation rate of a fuel in the fuel cell or fuel cell stack, reducing a purge rate of the fuel, decreasing an operating temperature of the fuel cell or fuel cell stack, decreasing an operating pressure of the fuel cell or fuel cell stack, or adjusting an excess air ratio or an excess fuel ratio of the fuel cell or fuel cell stack.

In the second aspect of the present invention, the regeneration of the fuel cell or fuel cell stack may include changing the operating current density of the fuel cell or fuel cell stack, changing the operating voltage, decreasing the first flow rate, or decreasing the second flow rate. In the second aspect of the present invention, the operating voltage may be decreased by implementing intermittent non-open circuit operating. In the second aspect of the present invention, the operating current density of the fuel cell or fuel cell stack may be changed to an intermediate current density of about 0.2 A/cm$^2$ to about 0.8 A/cm$^2$. In the second aspect of the present invention, the first flow rate or the second flow rate may be decreased by adjusting the anode stoichiometry at the anode inlet or adjusting the cathode stoichiometry at the cathode inlet respectively. In the second aspect of the present invention, if the time spent operating the fuel cell or fuel cell stack above the threshold voltage is above a threshold time, the operating voltage may be decreased, the first flow rate may be decreased, or the second flow rate may be decreased to regenerate the fuel cell or fuel cell stack.

In the second aspect of the present invention, the regeneration of the fuel cell or fuel cell stack may include regenerating reversible degradation of the fuel cell or fuel cell stack.

In the second aspect of the present invention, a model is used to determine when to initiate the generation or when to stop the regeneration.

In the first and second aspect of the present invention, the threshold voltage may be about 0.7 V to about 0.85 V. In the first and second aspect of the present invention, the threshold time may be about 25 hours.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of regenerating degradation of a fuel cell or fuel cell stack, comprising:
monitoring time spent operating the fuel cell or fuel cell stack above a threshold voltage,
determining a need for regenerating the degradation of the fuel cell or fuel cell stack,
regenerating the degradation of the fuel cell or fuel cell stack when time spent operating the fuel cell or fuel cell stack is above a threshold time by:
increasing humidity in the fuel cell or fuel cell stack,
changing an operating current density of the fuel cell or fuel cell stack to an intermediate current density of about 0.2 A/cm$^2$ to about 0.8 A/cm$^2$,
implementing intermittent non-open circuit voltage that is based on the threshold voltage, and
ending regeneration of the fuel cell or fuel cell stack.

2. The method of claim 1, wherein regenerating the fuel cell or fuel cell stack comprises regenerating reversible degradation of the fuel cell or fuel cell stack.

3. The method of claim 1, wherein determining the need for regenerating the fuel cell or fuel cell stack comprises using a model to estimate the threshold time.

4. The method of claim 1, wherein determining the need for regenerating the fuel cell or fuel cell stack comprises determining the time the fuel cell or fuel cell stack has spent operating at high voltage conditions and comparing the time the fuel cell or fuel cell stack has spent operating at high voltage conditions to the threshold time.

5. The method of claim 4, wherein the time the fuel cell or fuel cell stack has spent operating at high voltage conditions is a fixed time or a weighted time, and the time is determined by a model based on an operating current density or an operating voltage of the fuel cell or fuel cell stack.

6. The method of claim 1, wherein ending regeneration of the fuel cell or fuel cell stack is initiated after a fixed time.

7. The method of claim 1, wherein ending regeneration of the fuel cell or fuel cell stack is based on a model or is based on the fuel cell or fuel cell stack voltage before and after regenerating the fuel cell or fuel cell stack, and wherein the fuel cell or fuel cell stack voltage after regenerating the fuel cell or fuel cell stack does change from the fuel cell or fuel cell stack voltage before regeneration by more than about 1%.

8. The method of claim 1, wherein regenerating the degradation of the fuel cell or fuel cell stack comprises increasing a recirculation rate of a fuel in the fuel cell or fuel cell stack, reducing a purge rate of the fuel, decreasing an operating temperature of the fuel cell or fuel cell stack, decreasing an operating pressure of the fuel cell or fuel cell stack, or adjusting an excess air ratio or an excess fuel ratio of the fuel cell or fuel cell stack.

9. The method of claim 1, wherein the threshold voltage is about 0.7 V to about 0.85 V.

10. The method of claim 1, wherein the threshold time is about 25 hours.

* * * * *